US006004176A

United States Patent [19]

Moran

[11] Patent Number: 6,004,176

[45] Date of Patent: Dec. 21, 1999

[54] ASPIRATOR ASSEMBLY

[75] Inventor: Marc Moran, Colts Neck, N.J.

[73] Assignee: Air Cruisers Company, Wall, N.J.

[21] Appl. No.: 09/064,124

[22] Filed: Apr. 21, 1998

[51] Int. Cl.[6] .................................................. B63B 35/58

[52] U.S. Cl. .............................................. 441/41; 417/191

[58] Field of Search .................................... 417/179, 184, 417/191; 441/41

[56] References Cited

U.S. PATENT DOCUMENTS

| | | | |
|---|---|---|---|
| 3,429,330 | 2/1969 | Bogossian et al. | 441/41 |
| 3,468,472 | 9/1969 | Hahn | 417/191 |
| 3,598,504 | 8/1971 | Siravo . | |
| 3,659,962 | 5/1972 | Zink et al. . | |
| 3,684,404 | 8/1972 | Galbraith . | |
| 3,771,913 | 11/1973 | MacPherson et al. . | |
| 4,008,983 | 2/1977 | Flatt et al. . | |
| 4,297,084 | 10/1981 | Wayt | 417/179 |
| 4,368,009 | 1/1983 | Heimovics, Jr. . | |
| 4,478,587 | 10/1984 | Mackal | 441/41 |
| 4,566,862 | 1/1986 | Halavais . | |
| 4,579,141 | 4/1986 | Arff | 441/41 |

*Primary Examiner*—Stephen Avila
*Attorney, Agent, or Firm*—Lawrence G. Fridman

[57] ABSTRACT

An aspirator assembly having an air-gas mixing tube mated with an aspirator housing cap with a tapered socket interface and wherein an inlet check valve closure mechanism provides for manually selectable permission or prevention of the opening of ambient air inlet check valves by employing twin lock bars mounted in central swiveling relation about a check valve hinge support member which spans the inlet end of the aspirator housing cap.

20 Claims, 6 Drawing Sheets

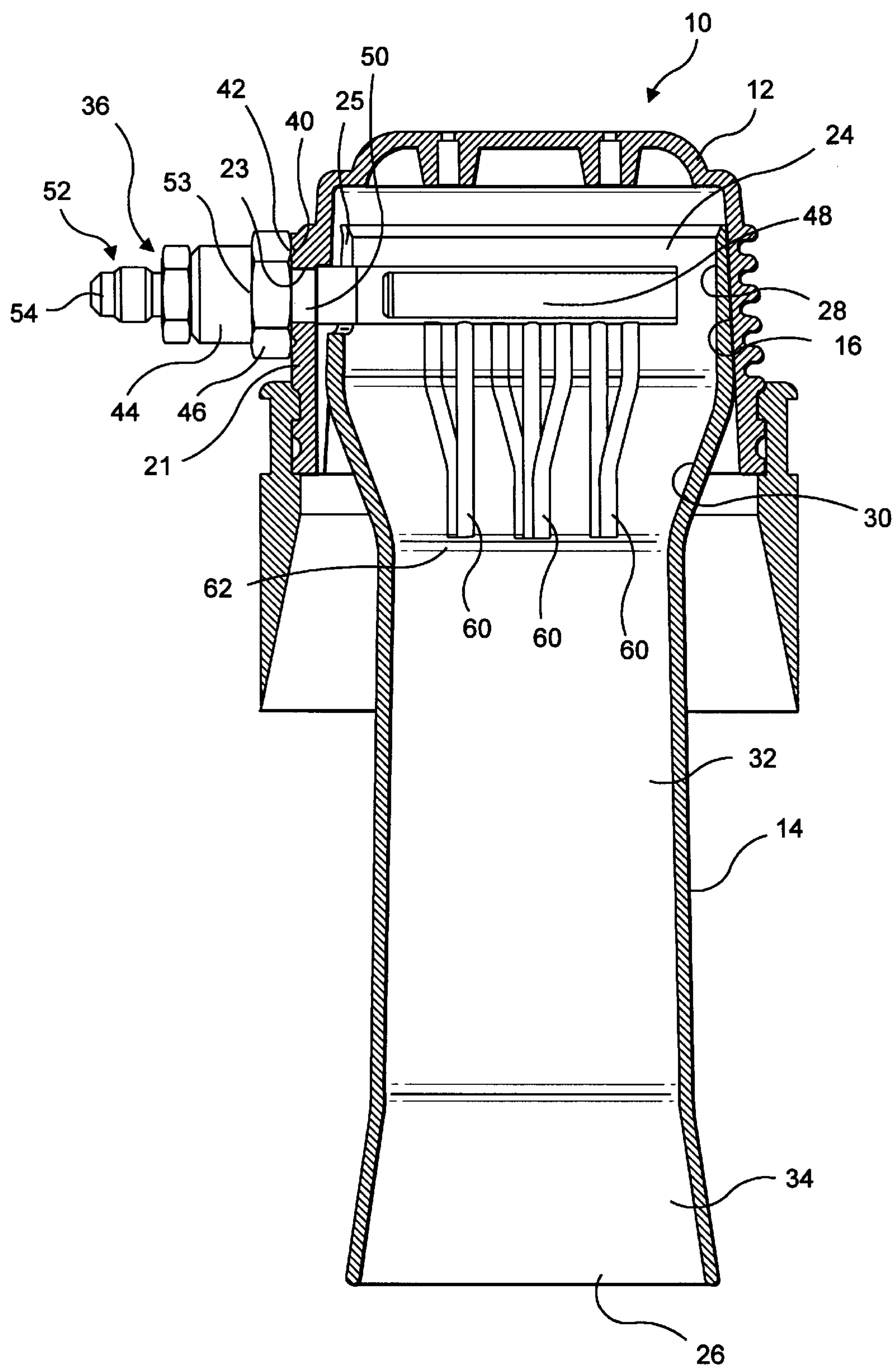
F I G. 2

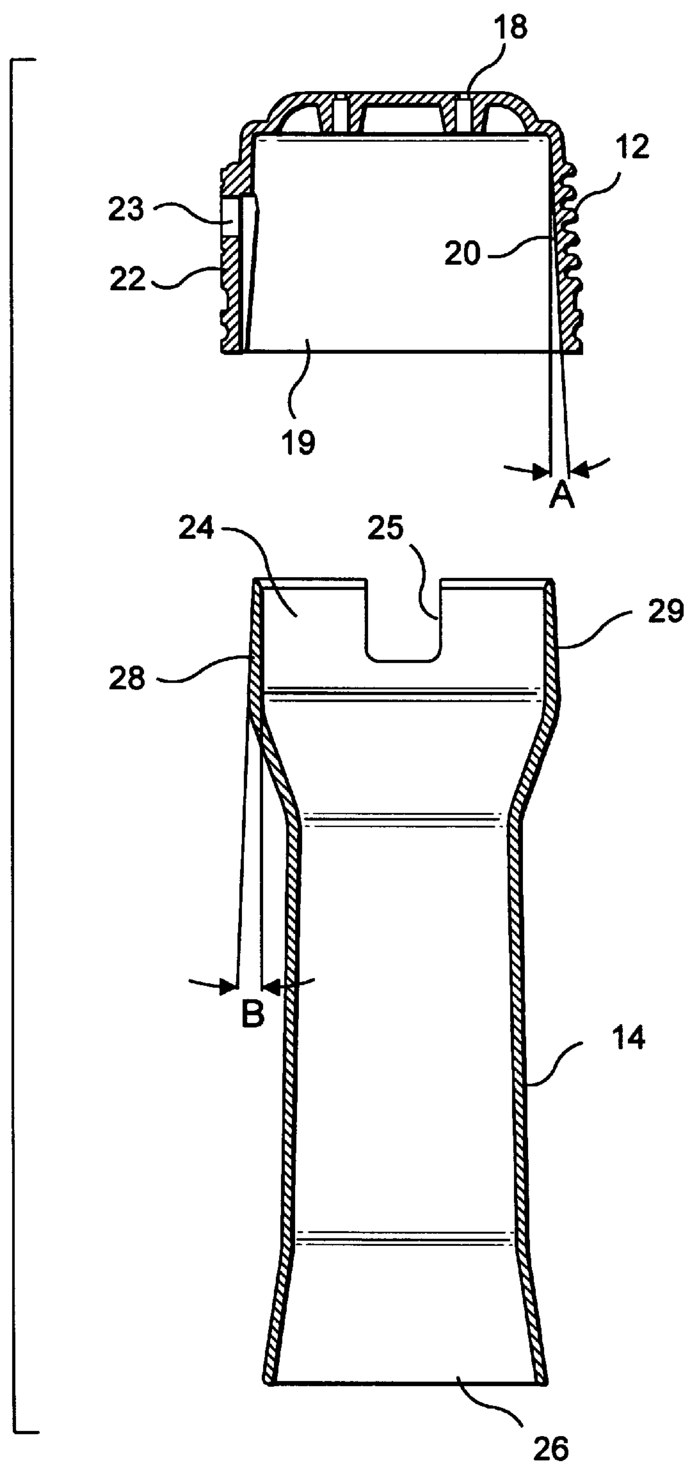
F I G. 10

ASPIRATOR ASSEMBLY

FIELD OF THE INVENTION

The present invention relates to devices which are used for rapid inflation and deployment of inflatable structures such as evacuation slides, rafts and the like, and more specifically to an aspirator assembly.

BACKGROUND OF THE INVENTION

Rapid inflation systems are currently used in various applications, but have achieved significant commercial recognition in the aviation industry in connection with the rapid inflation of evacuation slides and liferafts which are deployed in emergencies. Typical rapid inflation systems use pressurized primary gas to induce or aspirate a secondary gas or ambient air to combine with the pressurized gas so as to rapidly inflate an inflatable structure such as an evacuation slide. Specifically, in such aspirator devices, a pressurized primary gas is rapidly introduced into the aspirator assembly through a nozzle arrangement. This rapid introduction of pressurized primary gas in combination with certain design of a mixing area or tube creates a partial vacuum within the aspirator assembly, and thereby entrains a secondary gas or ambient air to enter the aspirator assembly through inlet check valves provided for that purpose. Once inside the aspirator assembly, the ambient air passes through a converging region of the aspirator assembly, through a transition zone, and mixes with the primary gas in a mixing region to generate a combined air-gas flow mixture. This combined air-gas flow exits the aspirator assembly through a discharge region of the tube which is normally disposed within an inflatable structure. Thus, the aspirator assembly uses a small volume of pressurized primary gas to entrain a relatively large volume of a secondary gas or ambient air to inflate an inflatable structure. The efficiency of the aspirator assembly is often measured by its "mass-flow ratio," which is a ratio of the volume of primary gas used by the aspirator assembly to the volume of secondary gas or ambient air entrained by the aspirator assembly.

The prior art references disclose aspirator assemblies which operate generally as described hereinabove, but which suffer from a number of drawbacks. It is known in the art that the mass-flow ratio of an aspirator assembly depends in large part on the location of the introduction of the primary gas into the aspirator assembly and location of the nozzle jets with respect to the transition zone between the converging and mixing regions of the mixing tube. While these prior art devices achieve sufficient entrainment of ambient air to rapidly inflate evacuation slides and liferafts in emergencies, none of the devices disclose a design capable of providing adjustments, so as to optimally locate and to lock such optimal position of the transition zone of the mixing tube with respect to the nozzle jet assembly.

As stated above, aspirator assemblies are typically used in high-stress emergency situations. It is not uncommon for the inlet check valves to be inadvertently pushed open by passengers' fingers, aircraft debris, etc. after the evacuation slide or raft has been inflated. This can cause the evacuation slide or raft to deflate, compromising its safety and effectiveness. It is known in the prior art to provide safety features preventing undesirable accidental deflation of the emergency evacuation structures; design of such features, however, has been complicated, making them expensive to maintain and manufacture.

Finally, due to the probability of widespread commercial application of aspirator assemblies, those aspirators which are most easily manufactured and assembled are most desirable. The prior art devices often employ a multiple-piece housing design in which the major components of the device are either welded or bolted together, which complicates manufacture of the device.

It is, therefore, an object of the present invention to provide an aspirator assembly having an increased efficiency leading to reduction of time required to inflate a given inflatable structure.

It is also an object of the present invention to provide an aspirator assembly having a selectively sealable inlet and, thereby providing the ability to alternatively permit or prevent opening of the aspirator inlet check valve.

It is also an object of the present invention to provide an aspirator assembly having a simplified assembly process, thereby reducing manufacturing time, manufacturing errors, and manufacturing inefficiencies.

SUMMARY OF THE INVENTION

One aspect of the present invention provides an aspirator assembly for use in emergency evacuation inflatable devices consisting of a housing cap and a mixing tube. The housing cap and mixing tube are adapted for mutual engagement and the aspirator assembly is formed having an inlet at the housing cap and the outlet at the mixing tube so that a flowpath is formed within the aspirator assembly in the inlet-outlet direction. The housing cap is formed with a substantially hollow interior portion extending between front and rear parts thereof. The interior portion is formed with an internal taper extending outwardly in the inlet-outlet direction of the aspirator assembly. The mixing tube has an upstream part and a downstream part interconnected by a central part, an outer portion of the upstream part is formed with an external taper extending inwardly in the outlet-inlet direction of the aspirator assembly. Upon initial engagement between the internal taper of the housing cap and the external taper of the mixing tube at least the proximal part of the mixing tube is locked within the interior portion of the housing cap. The internal taper of the housing cap extends away from a longitudinal axis of the aspirator assembly and the external taper of the mixing tube extends toward the longitudinal axis. The internal outwardly extending taper portion of the housing cap and the external inwardly extending taper of the mixing tube form a tapered socket interface in the area of engagement between the housing cap and the mixing tube.

Another aspect of the present invention provides an aspirator assembly, wherein the tapered socket interface forming a double wall structure in the area of engagement between the housing cap and the mixing tube. Upon locking of the external taper of the mixing tube with internal taper of the housing cap, the proximal part of the mixing tube is positioned within the interior portion of the aspirator assembly at the predetermined distance from the inlet of the aspirator assembly.

A further aspect of the present invention provides an aspirator assembly including a nozzle assembly disposed at the proximal part of the mixing tube, an arrangement for introducing pressurized gas into the nozzle assembly and a valve for controlling a flow of gas through the inlet of the aspirator assembly. Such valve has a valve member movable within the interior of the aspirator assembly so as to keep the inlet open upon movement of fluid through the aspirator assembly in the inlet-outlet direction and to keep the inlet closed upon movement of said fluid in the outlet-inlet direction.

Still another aspect of the invention provides a method of assembly of an aspirator for emergency evacuation inflatable devices, in which the aspirator comprises a housing cap and a mixing tube adapted for mutual engagement. The aspirator having an inlet at the housing cap and an outlet at said mixing tube, so that a flowpath is formed within the aspirator in the inlet-outlet direction. The housing cap is formed with interior and exterior portion and extends between front and rear parts thereof. The interior portion of the housing cap has an internal taper extending outwardly in the inlet-outlet direction and the mixing tube has an upstream part and downstream part, an outer portion of the upstream part is formed with an external taper extending inwardly in the outlet-inlet direction. The method consists of the steps of positioning of the upstream part of the mixing tube at the rear part of the aspirator housing. Inserting at least the upstream part into the interior portion of the aspirator housing cap until mutual engagement is achieved therebetween, and locking positioning of the external taper of the mixing tube within the internal taper of the aspirator housing cap.

More particularly, the present invention comprises an aspirator assembly having a tubular housing cap and a mixing tube, each being adapted for mutual engagement by means of a tapered socket interface. This tapered socket interface is defined by a tapered receiving socket situated within the housing cap and a tapered socket region formed at a first open end of the mixing tube. The taper of the tapered socket region matches the taper of the tapered receiving socket, such that when the tapered socket region is mated into the tapered receiving socket, the friction between the mated surfaces substantially secures the housing cap and the mixing tube in mutual engagement.

When the tapered socket region is mated into the tapered receiving socket, all of the nozzle assembly components of the aspirator assembly are essentially enclosed within the mixing tube. Further, the tapered socket region extends almost to the ambient air inlet. Thus, the length of the mixing tube essentially defines the length of the aspirator assembly. This is significant in that the length of the mixing tube is ideal for achieving the optimum efficiency of the aspirator assembly, and therefore the aspirator assembly is at its optimum length. It should be noted that due to the increased efficiency of the present invention, the space needed to store the pressurized primary gas is also minimized, as less pressurized primary gas will be needed to achieve the same results as aspirator assemblies of the prior art.

Pressurized primary gas is introduced into the aspirator assembly through a hole in the housing cap via a nozzle assembly which includes a plurality of nozzle jets. The structure of the nozzle jets allows sufficient flow of the pressurized primary gas through the nozzle jets while providing optimum turbulence as the pressurized primary gas exits the nozzle jets. This optimum turbulence provides a greater entrainment of ambient gas through the check valves with respect to the amount of pressurized primary gas being supplied through the nozzle jets. Thereby, the present invention provides an increased mass-flow ratio.

The mass-flow ratio of the present invention is further increased by virtue of how the tapered socket region is mated with the tapered receiving socket, i.e., ideally compact in its arrangement, such that the converging region of the mixing tube is positioned more closely to the source of ambient air (the inlet check valves), and the nozzle jets are positioned in the converging region such that they terminate in the transition zone. The combination of the optimum turbulence in the transition zone and the almost immediate convergence to which the ambient gas is subjected when flowing into the converging region of the mixing tube further provides a greater entrainment of ambient gas through the check valves with respect to the amount of pressurized primary gas being supplied through the nozzle jets.

In addition, the flow of the gases is enhanced by the tapered socket interface design by virtue of the fact that when the tapered socket region of the mixing tube is mated into the tapered receiving socket of the housing cap, the nozzle manifold and the plurality of nozzle jets are essentially enclosed within the mixing tube and therefore the flowpath of the gases through the mixing tube is seamless.

The ambient air inlet is adapted with a positive closure mechanism which is manually operable to alternately permit or prevent the opening of two opposing inlet check valves. A hinge support member both defines the inlet openings and supports the two check valves in a spring closing relationship. Further, inner and outer lock bars are operably mounted in rotating relation about the center of the hinge support member such that in a normally open position, the lock bars are parallel to the hinge support member and thereby permit each of the pair of check valve members to open into the housing cap. In an alternate closed position, the lock bars are perpendicular to the hinge support member and thereby prevent each of the pair of check valve members from opening into the housing cap. Accordingly, each of the pair of check valve members is sufficiently rigid to resist deformation when the positive closure mechanism is in the closed position and a partial vacuum is created within the aspirator assembly, or if inadvertent external pressure is applied to one or both of the check valves. Thus, the closing mechanism provides the ability to alternatively permit or prevent the opening of each of the pair of check valves. Therefore, when the positive closure mechanism is in the open position, each of the pair of check valve members can open to allow ambient air to enter the aspirator assembly, and when the closure mechanism is in the closed position, each of the pair of check valve members cannot be inadvertently opened to cause deflation of the inflatable structure.

The design of the present invention provides for substantially easier manufacturing of the aspirator assembly. The housing cap and the mixing tube can be made from plastic and can be injection molded. In fact, the angle of the tapered socket interface is ideal for injection molding. The angle allows the housing cap to be injection molded because the angle allows the injection molded housing cap to be removed from the core of an injection molding machine. Further, the tapered socket region of the mixing tube can be injection molded to fit into the tapered receiving socket of the housing cap.

The tapered socket interface design provides a strategically located point of separation between the housing cap and the mixing tube. This facilitates installation of the internal mechanical components of the aspirator assembly such as the check valves and the components of the nozzle assembly.

Additionally, the tapered socket region of the mixing tube can easily be correctly mated with the tapered receiving socket of the housing cap. It is also integral to the design of the present invention that the nozzle jets be positioned in the converging region of the mixing tube such that they terminate in the transition zone.

The mixing tube can be rotated and otherwise linearly adjusted with respect to the tapered receiving socket prior to mating the tapered socket region with the tapered receiving socket. This ability to pre-position the tapered socket region makes it easier to correctly mate the tapered socket region with respect to the nozzle assembly components. Further, the design of the present invention, specifically the angle of the tapered socket interface, ensures that when the components are mated the nozzle jets will be correctly positioned in the converging region of the mixing tube. The angle of the tapered socket assembly prevents the tapered socket region from being seated too deeply in the tapered receiving socket. Therefore, when the components are fully mated, the position of the nozzle jets with respect to the converging region of the mixing tube is correct.

Moreover, no special tooling is required to assemble the components of the present invention. Assembly can be accomplished by hand, and requires minimal training. As stated above, the margin for error in correctly positioning the components with respect to the other components is negligible. Manufacturing time is substantially reduced by these aspects of the present invention. Further, once the tapered socket region is mated with the tapered receiving socket, the frictional forces between the inner side surface of the housing cap and the outer surface of the tapered socket region of the mixing tube substantially secure the housing cap and the mixing tube in mutual engagement in a tapered socket interface. It is also recommended to apply a permanent adhesive between these surfaces in order to secure positioning of the element in the tapered socket interface.

Further features and advantages of the present invention will appear more clearly on a reading of the detailed description of the preferred embodiment of the present invention, which is given below with reference to the accompanying drawings.

BRIEF DESCRIPTION OF THE DRAWINGS

FIG. 2 is a cut away side view of the aspirator assembly of the preferred embodiment of the present invention, including components of the nozzle assembly;

FIG. 10 is a cut away exploded view of the housing cap and mixing tube.

DESCRIPTION OF THE PREFERRED EMBODIMENT

Figure 1:
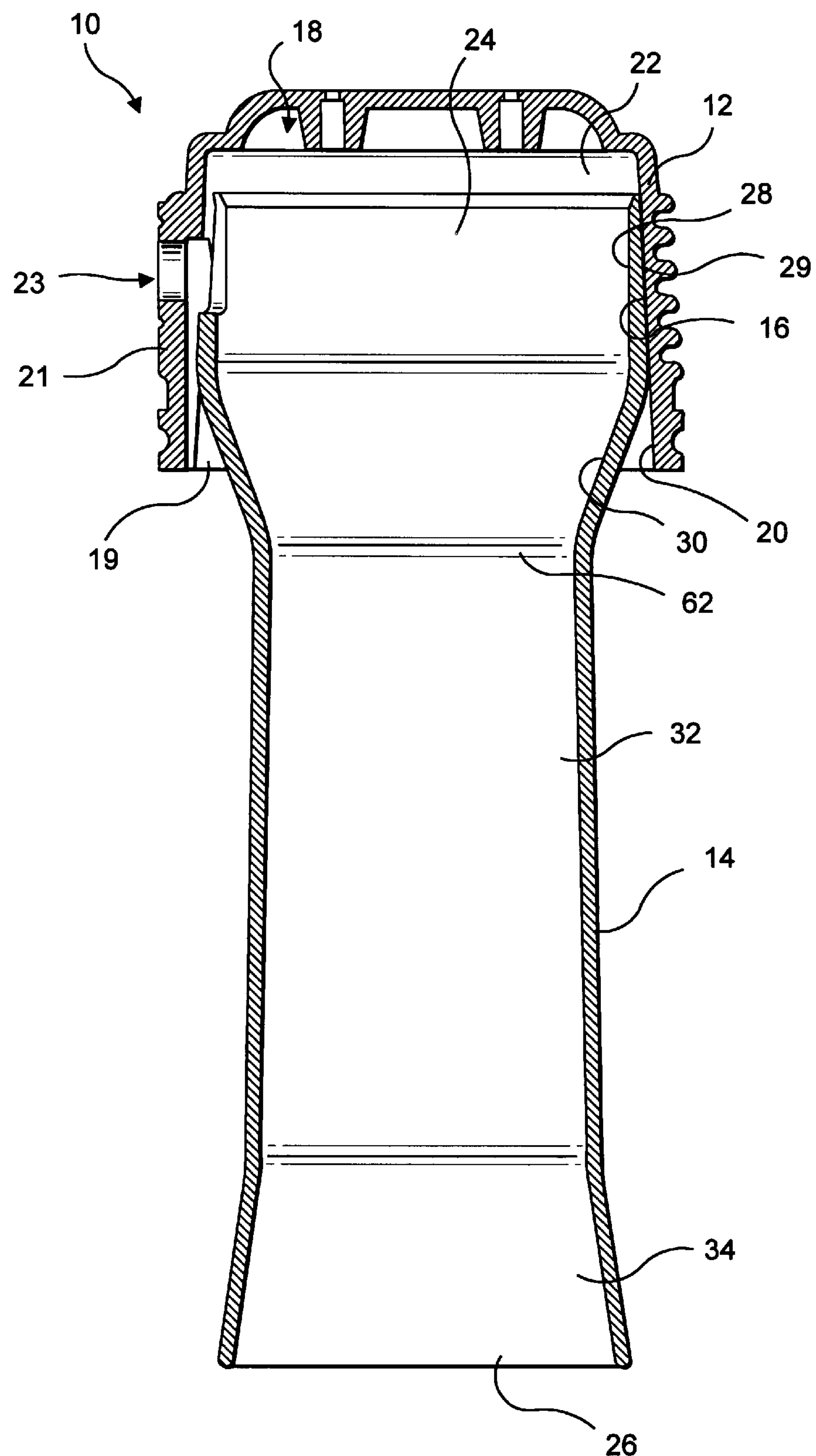
FIG. 1 is a cut away side view of the aspirator assembly of the preferred embodiment of the present invention, not including components of the nozzle assembly.

While the present invention will be described more fully hereinafter with reference to the accompanying drawings, in which particular embodiments are shown, it is to be understood at the outset that persons skilled in the art may modify the invention herein described while achieving the functions and results of this invention. Accordingly, the descriptions which follow are to be understood as illustrative and exemplary of specific structures, aspects and features within the broad scope of the present invention and not as limiting of such broad scope.

A preferred embodiment of the aspirator assembly according to the present invention is illustrated in FIGS. 1–10. More particularly, referring now to FIG. 1, the aspirator assembly 10 of the present invention comprises a substantially tubular housing cap 12 and a mixing tube 14, each being adapted for mutual engagement by means of a tapered socket interface 16. The housing cap 12 has an inlet end 18, an outlet end 19, an inner side surface 20, an outer side surface 21, and a hole 23 providing communication between the inner and outer side surfaces 20,21. The inner diameter of the housing cap 12 varies along its length, so that an increasing taper is formed in the inlet end 18 to the outlet end 19 direction, thereby defining a tapered receiving socket 22.

The mixing tube 14 has a first open end 24 with a notch 25, and a second open end 26. The diameter of the mixing tube 14 varies along its length, forming in the axial sequence a preconverging or tapered socket region 28, a converging region 30, a mixing region 32, and a diverging region 34, whereby the meeting of the converging region 30 and the mixing region 32 defines a transition zone 62. The tapered socket region 28 has an outer surface 29 which is formed to fit into the tapered receiving socket 22 of the housing cap 12. Specifically, the tapered socket region 28 extends from the first open end 24 of the mixing tube 14 to the converging region 30 of the mixing tube 14, and has a diameter at the first open end 24 of the mixing tube 14 substantially matching the inner diameter of the housing cap 12 in the vicinity of the inlet end 18. The diameter of the tapered socket region 28 then varies along the axial length thereof as an increasing taper in the first open end 24 of the mixing tube 14 to the converging region 30 direction. This increasing taper matches the increasing inner taper of the tapered receiving socket 22 of the housing cap 12, so that the tapered socket region 28 of the mixing tube 14 is mated into the tapered receiving socket 22 of the housing cap 12. In this condition, the frictional forces between the inner side surface 20 of the housing cap 12 and the outer surface 29 of the tapered socket region 28 of the mixing tube 14 substantially secure the housing cap 12 and the mixing tube 14 in mutual engagement in a tapered socket interface 16. Thus, the tapered socket interface 16 upon initial assembly provides a double-wall thickness at the area of the aspirator assembly 10 which is subject to the greatest stress. In this tapered socket interface 16, the notch 25 is aligned with the hole 23 to form clearance adapted for installation of a nozzle assembly 36. Furthermore, as discussed hereinbelow, cooperation between the notch 25 and an inwardly extending portion 50 of the nozzle assembly 36 (see FIG. 2) provide the above-mentioned clearance and simplify adjustments of the mixing tube with respect to the nozzles.

The converging region 30 extends between the tapered socket region 28 and the mixing region 32 of the mixing tube 14. Where the converging region 30 meets the tapered socket region 28, the converging region 30 has a diameter substantially equal to the diameter of the tapered socket region 28 of the area where the tapered socket region 28 meets the converging region 30. The diameter of the converging region 30 then varies along the axial length thereof in a decreasing taper toward the mixing region 32.

The mixing region 32 extends between the converging region 30 and the diverging region 34 of the mixing tube 14. Where the mixing region 32 meets the converging region 30, the mixing region 32 has a diameter substantially equal to the diameter of the converging region 30 at the junction therebetween. The diameter of the mixing region 32 varies along the axial length thereof in a slightly increasing taper toward the diverging region 34.

The diverging region 34 extends from the mixing region 32 of the mixing tube 14 to the second open end 26 thereof. Where the diverging region 34 meets the mixing region 32, the diverging region 34 has a diameter substantially equal to the diameter of the mixing region 32 at the place where the mixing region 32 meets the diverging region 34. The diameter of the diverging region 34 then varies along its axial length in an increasing taper toward the second open end 26 of the mixing tube 14.

In one embodiment of the invention, the structure of the device is composed of the housing cap and the mixing tube made out of plastic and produced by injection molding. This makes it possible to permanently connect these elements during the assembly by means of solvent welding. In this embodiment the geometry of the mating surfaces, i.e. the geometry of the inner surface 20 of the housing cap 12 and the outer surface 29 of the tapered socket region 28 of the mixing tube 14 becomes particularly important. In the invention, the geometry of the tapered socket interface 16 formed by the mating surfaces results not only in an effective assembly scheme but also provides correct geometry for injection molding. The angle of the tapered fit forming the solvent welded joint also provides the proper draft angles substantially facilitating ejection of these parts from the mold. The interior geometry of the aspirator assembly dictates the flow characteristics of the device. This function is enhanced by the strategic use of the draft angles that are needed for the efficient removal of the parts from the core of an injection molding machine.

Due to the fact that in the assembled condition of the invention the mixing tube is deeply inserted into the housing cap, the diverging draft angle A of the inner side surface 20 of the housing cap is reversed by the opposite draft angle B of the outer surface 29 of the mixing tube 14 (see FIG. 10). In the preferred embodiments such draft angles A and B are within the range of 1°–5°. This technique of matching the opposite draft angles not only produces parts that are drafted for efficient injection molding, but also provides the aspirator assembly which meets the gas flow geometry requirement.

Generally, injection molded plastic parts are of uniform thickness and seldom greater than 0.125 inches thick, which is a drawback from the strength point of view in plastic design. This is because in critical areas the thickness of the molded parts cannot be enlarged in order to increase their strength. The critical section for the assembled aspirator is typically located at the widest diameter of the assembly situated at the mounting flange. Such critical section of the body shares a load with a portion of the mixing tube that is socketed inside the housing cap forming a portion of the aspirator assembly having double wall thickness.

Formation of the aspirator assembly consisting of two main parts (the housing cap 12 and the mixing tube 14) substantially enhances installation of the internal components such as flapper doors and nozzle manifold. Once the housing cap and the mixing tube are put together through use of welding solvent, no other tooling is required to make the assembly.

Application of the solvent welding to the tapered socket interface is also beneficial because it enables the invention to avoid welding or brazing operations. Welding is undesirable in the present application because it is time-consuming, requires special inspection and makes the welded part susceptible to cracks.

Referring now to FIG. 2, the housing cap 12 is further adapted to accommodate a nozzle assembly 36. The hole 23 which communicates between the inner and outer side surfaces 20,21 of the housing cap 12 is surrounded on the outer side surface 21 of the housing cap 12 by an O-ring seat 40 and corresponding O-ring 42 positioned within the O-ring seat 40. A check valve-nozzle adapter 44 is formed with an internal check valve assuring passage of the primary gas in one direction, i.e. in the direction of the mixing tube. The check valve-nozzle adapter 44 having a flange 46 is inserted through the hole 38 such that the O-ring 42 is between the flange 46 and the outer side surface 21 of the housing cap 12.

A nozzle manifold 48 is threadably coupled in airflow channeling relation with an inwardly extending portion 50 of the check valve-nozzle adapter 44 which extends through the housing cap 12. This threadable coupling of the nozzle manifold and the inwardly extending portion 50 of the nozzle adapter 44 creates an airtight seal as the nozzle manifold 48 is compressed against the inner side surface 20 of the housing cap 12 and the flange 46 of the check valve-nozzle adapter 44 is compressed against the O-ring 42. The tapered socket region 28 of the mixing tube 14 is mated with the tapered receiving socket 22 of the housing cap 12. This mating is such that the inwardly extending portion 50 of the nozzle manifold 48 is received into and accommodated by the notch 25 provided at the first open end 24 of the mixing tube 14. This alignment allows the first open end 24 and tapered socket region 28 of the mixing tube 14 to seat fully within the tapered receiving socket 22 of the housing cap 12 thereby achieving the tapered socket interface 16 described above. Furthermore, this alignment also creates the clearance and facilitates axial adjustment of the mixing tube with respect to the nozzles 60 during assembly of the aspirator.

A fitting 52 is threadably or in any other conventional manner coupled to a nozzle receiving end 53 of the check valve-nozzle adapter 44. A receiving end 54 of the fitting 52 is adapted through a respective tubing to receive a quantity of pressurized primary gas.

The design of the nozzle assembly 36 creates a cantilever support for the nozzle manifold 48 as it extends through the housing cap 12 and the mixing tube 14 and supports a plurality of nozzle jets 60. Each of the nozzle jets 60 is mounted on the nozzle manifold 48 and, in the assembled condition of the invention, extends through the converging region 30 of the mixing tube 14 and terminates in the transition zone 62.

Figure 3:
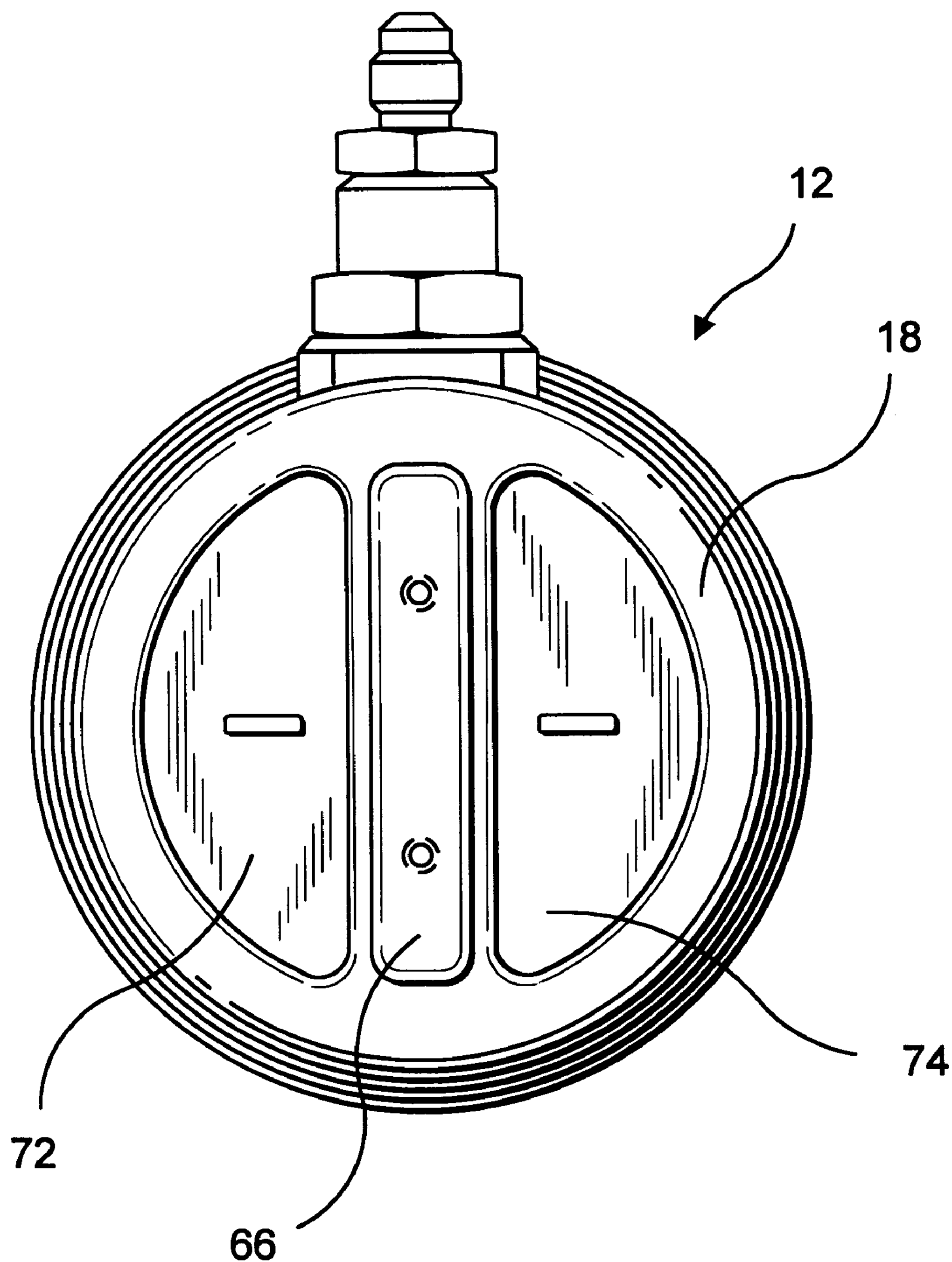
FIG. 3 is a top view of the aspirator assembly of the preferred embodiment of the present invention.
Figure 4:
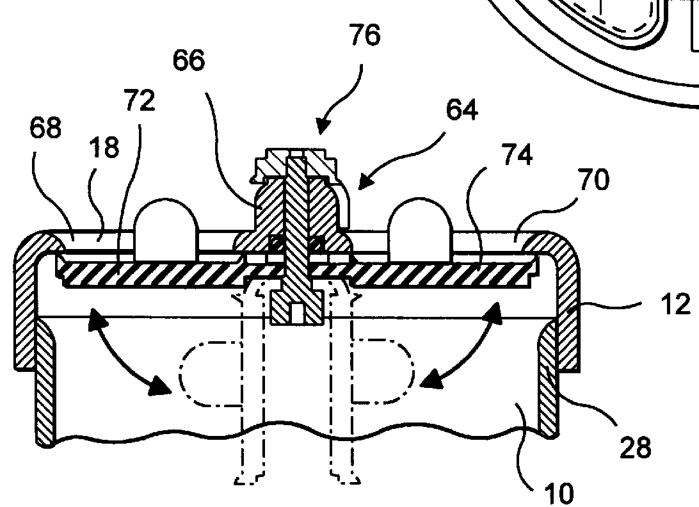
FIG. 4 is a cut away side view of the inlet valve assembly showing a positive closure mechanism of the present invention.

Referring now to FIGS. 3 and 4, the housing cap 12 is further designed at its inlet end 18 to include a secondary air inlet valve assembly 64 which is adapted for controlling flow of secondary gas or ambient air into the aspirator. The inlet valve assembly 64 comprises a pair of first and second semi-circular check valve members 72,74. A support member 66 spans the inlet end 18 of the housing cap 12, and thereby defines semi-circular first and second inlet openings 68,70 in the inlet end 18 of the housing cap 12. The first and second check valve members 72,74 are hinged about the support member 66 such that the check valve members 72,74 cover the inlet openings 68,70 under conditions of substantially equal pressure on either side of the check valves 72,74, or of greater pressure on the inside of the housing cap 12.

Alternatively, under conditions of lower pressure on the inside of the housing cap 12, the check valve members 72,74 open into the housing cap 12 to permit the entrainment of ambient air into the aspirator assembly 10. Each of the pair of check valve members 72,74 is slightly larger than its respective inlet opening 68,70, and therefore does not open outwardly from the housing cap 12. Additionally, each of the pair of check valve members 72,74 is sufficiently rigid to withstand substantial back pressure from within the aspirator assembly 10 without deformation.

Referring now to FIGS. 5, 6, 7, 8 and 9, where the inlet valve assembly 64 is illustrated in top, bottom, locked, and unlocked positions. More particularly, the inlet valve assembly 64 is adapted with a positive closure mechanism 76 which is manually operable to alternately permit or prevent the opening of the check valve member 72,74. The closing mechanism 76 comprises inner and outer lock bars 78,80 each having length and width substantially corresponding to the respective length and width of the support member 66. The lock bars 78,80 are operably mounted in manually swivelable relation about the center of the support member 66, on respectively the top and bottom sides of the support member 66.

The outer lock bar 80 is formed to be activated by hand and contains an interior part 81 having side walls 82,84 extending from each end of the outer lock bar 82 toward the central part thereof. Thus, the length of each side wall is slightly shorter than half of the length of the outer lock bar 80. Therefore, the interior part 82 forms a cavity which is in the open condition of the closure arrangement is adapted for mutual engagement with outwardly extending part of the support member 66. In this condition, the side walls 82,85 engage the sides of support member 66 preventing the outer and inner lock bars from further turning and shifting from an open to the closed condition of the assembly.

Figure 5:
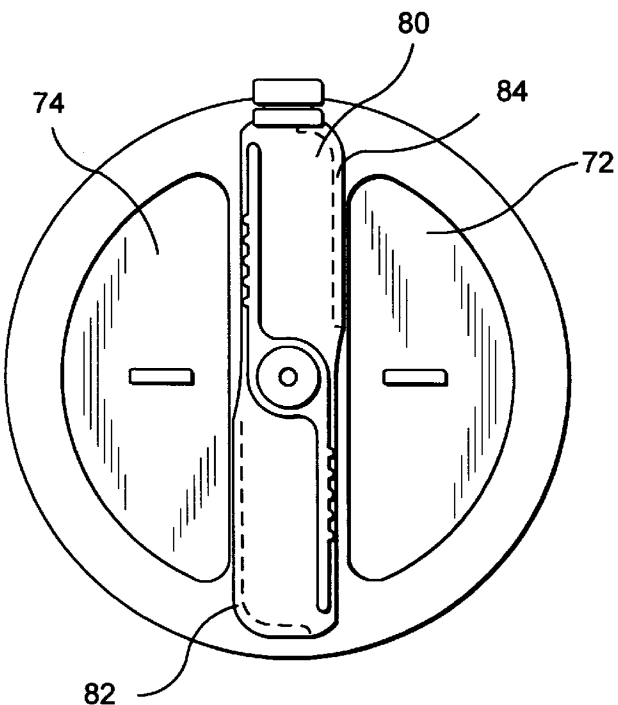
FIG. 5 is a top view of the inlet valve assembly of the present invention, showing the closure mechanism in an open position.
Figure 7:
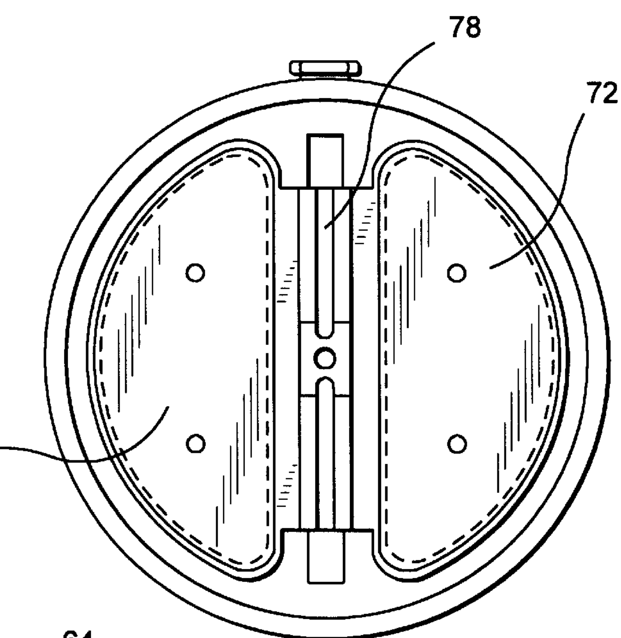
FIG. 7 is a bottom view of the inlet valve assembly of the present invention, showing the closure mechanism in an open position.
Figure 6:
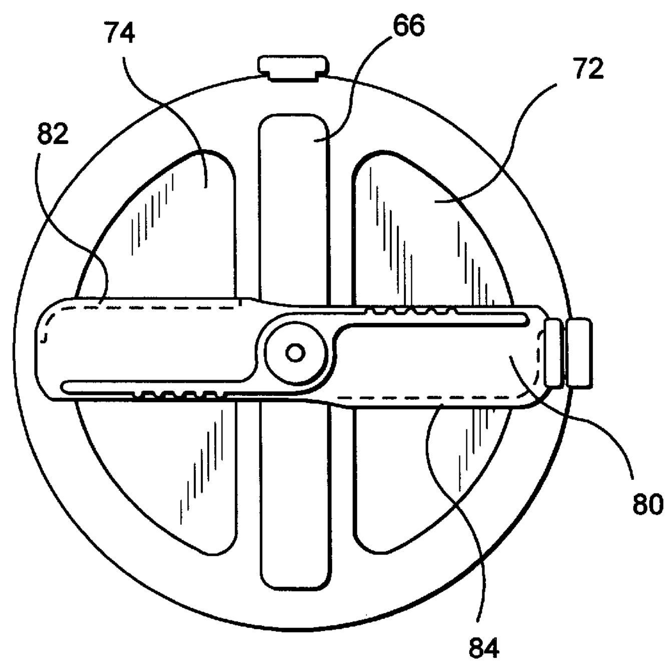
FIG. 6 is a top view of the inlet valve assembly of the present invention, showing the closure mechanism in a closed position.
Figure 8:
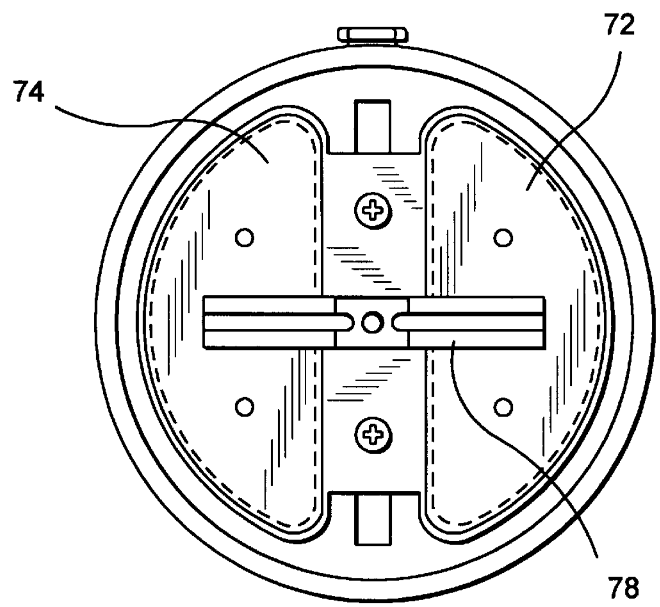
FIG. 8 is a bottom view of the inlet valve assembly of the present invention, showing the closure mechanism in a closed position.
Figure 9:
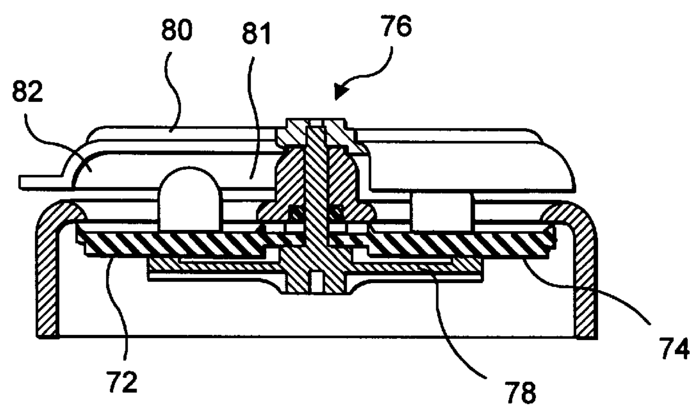
FIG. 9 is another cut away side view of the inlet valve assembly showing a positive closure mechanism.

In a normally open position (as illustrated in FIGS. 5 and 7), the lock bars 78,80 are parallel to the hinge support member 66 and thereby permit each of the pair of check valve members 72,74 to open into the housing cap 12. In the alternate closed position (as illustrated in FIGS. 6 and 8), the lock bars 78,80 are substantially perpendicular to the support member 66, such that lock bar 78 prevents each of the pair of check valve members 72,74 from opening into the housing cap 12. Accordingly, each of the pair of check valve members 72,74 is sufficiently rigid to resist deformation when the closing mechanism 76 is in the closed position. This enables the invention to withstand inadvertent manual pressure applied to the check valve members 72,74 which would otherwise open the inlet valve assembly 64.

When the aspirator assembly 10 is operated with the closure mechanism 76 of the inlet valve assembly 64 in the open position, pressurized primary gas from a gas source such as a compressed air bottle or a gas generator is received by the nozzle assembly 36 at the receiving end 54 of the nozzle head 52. The pressurized primary gas then flows rapidly through the nozzle head 52 and nozzle manifold 48, and exits the nozzle assembly 36 through the plurality of nozzle jets 60. Upon proper positioning of the nozzle assembly 36 with respect to the mixing tube 14, the flow of pressurized primary gas from the plurality of nozzle jets 60 creates an effective partial vacuum area in the transition zone 62. This pressure differential entrains a secondary gas or ambient air to open the pair of opposing first and second check valve members 72,74, so as to generate rapid flow toward the partial vacuum area. Once the ambient air reaches the partial vacuum area, it is induced by the flow of the primary gas to mix with the primary gas in the mixing region 32 of the mixing tube 14. The air-gas mixture flows through the mixing region 32 and is discharged from the mixing tube 14 into the inflatable structure through the diverging region 34. When the inflatable structure is completely inflated, back pressure from the inflatable structure causes each of the check valve members 72,74 to close so as to stop the flow of ambient air into the aspirator assembly 10.

As indicated hereinabove, in operation of the aspirator assembly of the invention, a partial vacuum or low pressure area is created at the transition zone 62 between converging and mixing regions of the mixing tube. Such partial decrease in pressure causes the check valve members 72,74 to be opened and secondary gas or ambient air to be entrained into the flow of pressurized primary gas. The velocity of escaping high-pressure primary gas is at a maximum adjacent to the exit ends of the nozzle jets 60, where maximum potential for energy conversion in the aspirator assembly exists. Therefore, during the assembly of the aspirator it is highly desirable to position the nozzle head 52 within the mixing tube 14 in such a manner that the exit ends of the nozzle jets 60 are situated within the transition zone 62.

The tapered socket interface structure 16 of the invention substantially simplifies this challenging task. After the nozzle head 52 is placed within the interior of the aspirator, longitudinal positioning of the mixing tube including the transition zone 62, can be adjusted with respect to the exit ends of the nozzle jets. This is achieved by a limited longitudinal movement of the tapered socket region 28 of the mixing tube regarding the tapered receiving socket 22 of the housing cap 12. During such motion, the notch 25 of the mixing tube slidably engages the inwardly extending portion 50 of the nozzle manifold. Upon positioning of the exit ends of the nozzles within the transition zone 62, the positioning of the nozzle assembly 36 within the aspirator is fixed by tightening the threadable coupling of the nozzle manifold. The frictional forces between the inner surface of the housing cap 12 and the outer surface 29 of the tapered socket region 28 of the mixing tube efficiently secure this desired positioning of the mixing tube 14 within the housing 12 during such adjustments.

In the aspirator of the invention, the tapered socket region 28 and the converging region 30 of the mixing tube are positioned deeply inside the housing cap 12, so that the first open end 24 is situated in the close vicinity of the inlet end 18 reducing the overall length of the assembly and minimizing extension of the mixing tube into the inflating chamber of the inflatable evacuation slide.

While there has been described and illustrated embodiments of specific superior compact aspirator assemblies for inflating inflatable structures, it will be apparent to those skilled in the art that variations and modifications are possible without deviating from the broad spirit and principle of the present invention. The present invention shall, therefore, be limited solely by the scope of the claims appended hereto.

What is claimed is:

1. An aspirator assembly for use in emergency evacuation inflatable devices, comprising:

a housing cap and a mixing tube adapted for mutual engagement, an aspirator assembly having an inlet at said housing cap and an outlet at said mixing tube, a flow path being formed within said aspirator assembly in the inlet-outlet direction;

said housing cap formed with a substantially hollow interior portion extending between front and rear parts thereof, said interior portion formed with an internal taper extending outwardly in said inlet-outlet direction of the aspirator assembly;

said mixing tube having an upstream part and a downstream part interconnected by a central part, an outer portion of said upstream part formed with an external taper extending inwardly in the outlet-inlet direction of the aspirator assembly, whereby upon initial engagement between said internal taper of said housing cap and said external taper of the mixing tube at least said proximal part of the mixing tube is securely positioned within said interior portion of the housing cap.

2. The aspirator assembly of claim 1, wherein said internal taper of the housing cap extends away from a longitudinal axis of the aspirator assembly and said external taper of the mixing tube extends toward said longitudinal axis and said internal outwardly extending tapered portion of the housing cap and external inwardly extending taper of the mixing tube form a tapered socket interface in the area of engagement between the housing cap and the mixing tube.

3. The aspirator assembly of claim 2, wherein at said tapered socket interface a double wall structure is formed in the area of engagement between the housing cap and the mixing tube.

4. The aspirator assembly of claim 3, wherein upon locking of said external taper of the mixing tube within the internal taper of the housing cap said proximal part of the mixing tube is positioned within the interior portion of the aspirator assembly at a predetermined distance from the inlet of the aspirator assembly.

5. The aspirator assembly of claim 1, further comprising a nozzle assembly disposed at said proximal part of the mixing tube, an arrangement for introducing pressurized gas into said nozzle assembly, a valve for controlling a flow of gas through said inlet of the aspirator assembly, said valve having a valve member movable within an interior of the aspirator assembly so as to keep said inlet open upon movement of fluid through said aspirator assembly in the inlet-outlet direction and to keep said inlet closed upon movement of said fluid in the outlet-inlet direction.

6. The aspirator assembly of claim 1, wherein an interior of said mixing tube forming a converging-diverging flowpath.

7. The aspirator assembly of claim 6, wherein said downstream part of said mixing tube formed as a flared portion.

8. A method of assembly of an aspirator for emergency evacuation inflatable devices said aspirator comprising housing cap and a mixing tube adapted for mutual engagement, said aspirator having an inlet at the housing cap and an outlet at said mixing tube, a flowpath being formed within said aspirator in the inlet-outlet direction; said housing cap formed with exterior and interior portions and extending between front and rear parts thereof, said interior portion having an internal taper extending outwardly in said inlet-outlet direction; said mixing tube having an upstream part and a downstream part interconnected by a central part, an outer portion of said upstream part formed with an external taper extending inwardly in said outlet-inlet direction;

said method comprising the steps of:

(a) positioning of said upstream part of the mixing tube at said rear part of the aspirator housing;

(b) inserting at least said upstream part into the interior portion of the aspirator housing until mutual engagement therebetween; and (c) locking positioning of the external taper of the mixing tube within the internal taper of the aspirator housing.

9. The method of assembly of claim 8, wherein, in said step (d) rotational positioning between the external and internal tapers are locked.

10. The method of assembly of claim 8, wherein, in said step (d) longitudinal positioning between said external and internal tapers are locked.

11. An aspirator assembly for inflating an inflatable structure, comprising:

a mixing tube having a first open end, a second open end, and an internal transition zone disposed therebetween, said second open end being selectively coupleable to said inflatable structure, said mixing tube further including an internal axially tapered first portion which narrows as it extends from the first open end to said internal transition zone, and an internally axially tapered second portion which widens as it extends from said internal transition zone to the second open end;

a housing cap having a hollow interior portion, a first open end for sealably mounting to said first open end of said mixing tube, and a second end having at least one valve associated therewith, said at least one valve being openable by a pressure differential between relative pressures inside and outside the housing cap such that when the pressure outside the housing cap is greater than the pressure inside, the at least one valve opens, and alternatively, when the pressure outside the housing cap is less than the pressure inside the housing cap, said at least one valve closes;

a nozzle assembly operably and airtightly coupled with said substantially hollow interior portion formed in said housing cap for selectively introducing a compressed fluid into said housing cap and said mixing tube, said nozzle assembly including a first coupling end which is coupleable to an external volume of compressed fluid, and an internal gas manifold and jet subassembly which introduces the compressed fluid into the internal transition zone, thus causing a decrease in the relative pressure inside the housing cap as compared with outside, thereby causing at least one valve to open and external air to be entrained into the housing cap and through the mixing tube and into the inflatable structure, said first open end of said mixing tube and said first open end of said housing cap having mutual conformations such that when one is inserted into the other, the two are locked together.

12. The aspirator assembly as set forth in claim 11, wherein said mixing tube and said housing cap are locked together by inserting the first end of said mixing tube into the first end of said housing cap.

13. The aspirator assembly as set forth in claim 12, wherein said mutual conformations comprise mutually engaging tapers of an exterior surface of said first open end of said mixing tube and said first open end of said housing cap.

14. The aspirator assembly as set forth in claim 11, wherein said mutual conformations which lock the mixing tube and the housing cap together further provide a double walled structure at the locus of engagement.

15. The aspirator assembly as set forth in claim 13, further including an adhesive material disposed between the lockably engaging mutually tapers of the mixing tube and the housing cap.

16. A positive closure mechanism for an aspirator, comprising a housing cap of an aspirator formed with a substantially hollow interior part, said hollow part extending between front and rear ends of the housing cap, said front end having at least one valve member associated therewith, said at least one valve member being operable by a pressure differential between relative pressure inside and outside the housing cap such that when the pressure outside the housing cap is greater than the pressure inside, said at least one valve member opens by extending within said substantially hollow interior part, and alternatively when the pressure outside the housing cap is less than the pressure inside the housing cap said at least one valve member closes, said housing cap further comprising a hinge support member situated at said front end of the housing cap and extending thereacross, said at least one valve member is hingeably mounted at said hinge support member and moves about said hinge support member between its open end closed conditions, a locking member for selectively locking said at least one valve member comprising a first lock bar selectively disposable in a position preventing said valve from opening.

17. The mechanism of claim 16, wherein there are a pair of valve members provided and each of said pair of valve members is hingeably mounted to said hinge support member and said locking member selectively locks said pair of valve members.

18. The mechanism of claim 17, wherein said first lock bar is mounted within said housing cap and associated with said hinge support member.

19. The mechanism of claim 18, wherein said first lock bar rotates about a pivotal point coupled to said hinge support member.

20. The mechanism of claim 19, further comprising a second lock bar, mounted to the exterior surface of said second end of said housing cap, to the hinge support member, and operably coupled to said first lock bar, such that selective rotation of said second lock bar causes a corresponding selective rotation of said first lock bar into and out of position to prevent the valves from opening;

whereby said first and second lock bars are mutually parallel, and are oriented relative to the hinge support member such that when the lock bars are substantially parallel to the hinge support member then valves may open, and when the lock bars are substantially perpendicular to the hinge support member then valves are locked closed.

* * * * *